No. 12,411. REISSUED NOV. 21, 1905.
R. TEMPLE.
PNEUMATICALLY ACTUATED TOOL.
APPLICATION FILED MAY 1, 1905.
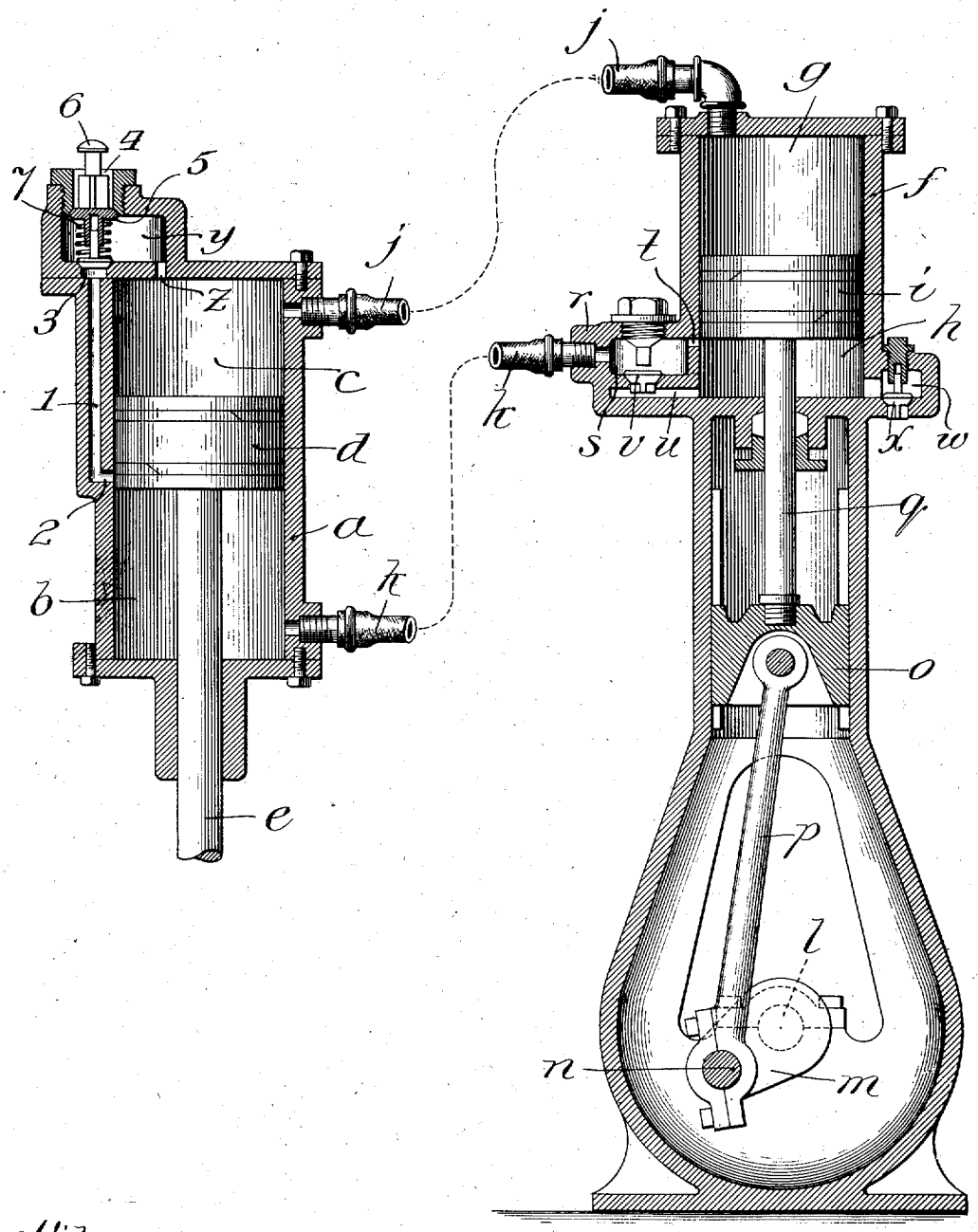
Witnesses:
Chas. C. Saylord.
John Enders.
Inventor:
Robert Temple,
By Thomas F. Sheridan,
Atty.

UNITED STATES PATENT OFFICE.

ROBERT TEMPLE, OF DENVER, COLORADO, ASSIGNOR TO THE TEMPLE GAS ENGINE & MACHINE COMPANY, OF DENVER, COLORADO, A CORPORATION OF COLORADO.

PNEUMATICALLY-ACTUATED TOOL.

No. 12,411. Specification of Reissued Letters Patent. Reissued Nov. 21, 1905.

Original No. 787,963, dated April 25, 1905. Application for reissue filed May 1, 1905. Serial No. 258,408.

*To all whom it may concern.*

Be it known that I, ROBERT TEMPLE, a citizen of the United States, residing in the city and county of Denver, State of Colorado, have invented certain new and useful Improvements in Pneumatically-Actuated Tools, of which the following is a specification.

This invention relates to that class of tools capable of being operated by the vibrations of a column of air under pressure, and particularly to the construction and arrangement of parts by which the air is admitted, compressed, and vibrated in the system to operate the desired translating devices, all of which will more fully hereinafter appear.

The principal object of the invention is to provide a simple, economical, and efficient mechanism for admitting, compressing, and vibrating or reciprocating a column or circuit of air through a desired system to any translating device, such as a pneumatic rock or ore drill.

Other objects of the invention will appear from an examination of the drawing and the following description and claims.

The invention consists principally in a pneumatically-actuated tool in which there are combined a tool-cylinder, a reciprocating tool-piston mounted therein, pulsating-engine-cylinder mechanism, reciprocating pulsating piston mechanism in such engine-cylinder mechanism, pipe or passage mechanism connecting the chambers of the pulsating engine and tool cylinders together, a by-pass or passage leading from one end of the tool-cylinder to a point near the middle thereof, and an automatic valve in said passage arranged to be opened and closed during the reciprocations of the tool-piston to admit air under pressure from one side of the tool-piston to the other.

The invention consists, further and finally, in the features, combinations, and details of construction hereinafter described and claimed.

In the accompanying drawing the figure shows vertical sectional elevations of tool and pulsating-engine cylinders, with attached parts forming the system, as such mechanisms appear when constructed in accordance with these improvements.

In the art to which this invention relates it is well known that in the use of the ordinary rock-drill, for instance, the drill is shoved forward under tremendous pressure and has to travel a predetermined distance before it can be retracted, so that when operating on certain kinds of rock it will stop at a short distance of its travel and refuse to be moved backward. This invention, therefore, is intended to be primarily an improvement on said type of tools in that instead of using compressed air and exhausting by the usual method air under desired pressure is maintained in the system and pulsated—that is, moved backward and forward—so as to operate the tool-piston and tool in any desired manner. It is further well known in this type of mechanisms that air-compressors have to be used to "prime" the system with the desired amount of air under pressure to begin operations. One of my improvements is intended to do away with separate priming-compressors and to provide means whereby air is admitted to the system whenever any part thereof falls below atmospheric pressure. Again, it is well known in this type of mechanisms that some kind of manually-operatable controlling-valve has heretofore been necessary to equalize the pressure in such system at both sides of the tool-piston—that is, when the pressure falls below a certain predetermined pressure in one side of the system some means has to be provided (heretofore a manually-operatable valve) to transfer a portion of the fluid-pressure or motive fluid from the high to the low side of the system. My improvements are further designed to obviate this manually-operated valve mechanism and to provide in lieu thereof an automatic valve mechanism that will operate at the desired times to transfer a portion of the fluid under pressure from the high to the low side, all of which will more fully hereinafter appear.

In construeting a tool in accordance with these improvements a tool-cylinder *a* is provided, having a cylindrical chamber in its inner portion, which is divided into two—a forward chamber *b* and a rear chamber *c*—by means of a reciprocating tool-piston *d*. The tool-piston has a projecting piston-rod *e* extending, preferably, out through one cylinder-head and to which any desired tool may be attached to suit different classes of work that it is desired to perform.

To reciprocate the tool-piston, a pulsating-engine cylinder *f* is provided, having two chambers *g* and *h*, partially formed and separated from each other by means of a pulsating piston *i*. Both of these chambers are connected with the chamber of the tool-cylinder by means of tubular mechanisms or pipes *j* and *k*. It will be noted in comparing the size of the chambers *b* and *c* of the tool-cylinder with the size of the chambers *g* and *h* of the pulsating-engine cylinder that the combined volume of the latter chambers is considerably less than that of the first-named chambers. This arrangement is provided for the purpose of giving greater elasticity of stroke to the tool-piston and is one of the factors that has made this type of tool a success.

In order to reciprocate the pulsating piston, a crank-shaft *l* is preferably provided, having a crank *m* with the usual wrist-pin *n*, the wrist-pin being connected with a cross-head *o* by means of a connecting-rod *p*. This cross-head is in turn connected with the pulsating piston by means of the piston-rod *q*. The crank-shaft can be operated in any desired way, either by being directly connected with the shaft of an electric motor, turbine-engine, or by means of a belt with any desired engine or prime mover.

It is very desirable to provide some means for admitting air into the system at the desired time or times and for dispensing with the usual separate priming compressing-engine. In order so to do, the pulsating-engine cylinder is provided with a supplemental casing *r*, having a supplemental chamber *s* therein, with which chamber the pipe *k*, that forms the connecting-passage between the chamber at one end of the pulsating-engine and tool cylinders, is connected. This supplemental chamber is connected with the chamber *h* of the pulsating-engine cylinder by means of a main port or passage *t*, arranged a short distance from the head of the cylinder at that end and which is also adapted to be entirely closed during the reciprocations of the pulsating piston. This supplemental chamber is further provided with an auxiliary port *u*, that connects it with the same chamber *h* of the pulsating-engine cylinder at a point adjacent to the head, so as to never be entirely closed. The auxiliary port or passage is provided with a check-valve *v*, that permits of any air being compressed in chamber *h* to enter pipe *k* when the piston is moving toward that end of the pulsating-engine cylinder after the main port is closed, but when the piston is moving oppositely, or away therefrom, and the air in chamber *h* is expanding no air can return from the supplemental chamber into the chamber *h* until the main port *t* is again uncovered. The reason for this arrangement will appear presently.

To admit air into the system through chamber *h* during the reciprocations of the pulsating piston, an emergency inlet-passage *w* is provided; in which is arranged an automatic check-valve *x*, so that when the pulsating piston *i* is moving toward that end of the cylinder and the air is compressed in chamber *h* above the atmospheric point said automatic valve remains closed or is kept seated; but when said piston is moving in the other direction and while the main port *t* is closed there will be times when the pressure in chamber *h* will fall down to or substantially below atmospheric pressure, and at such time or times the automatic valve *x* will open and admit an increment of air to the system and keep doing so at each complete reciprocation of the pulsating piston until the necessary amount of air under pressure has been built up in the system to perform the desired work.

As has already been suggested, it is highly desirable to provide some automatic means for transferring a portion of the air from one side of the system to the other. For instance, it will be seen that the air is primarily admitted to the side of the system formed by the chambers *b*, *h*, and *s* and the pipe of passage *k*, and unless some means be provided the system would get out of balance and the tool-piston be kept at the rear portion of the tool-cylinder and not perform the functions for which it is designed. In order to overcome this objection, the tool-cylinder is preferably provided with a supplemental chamber *y*, connected with the rear chamber of the tool-cylinder by means of a port or passage *z*. A by-pass or passage 1 is further provided in the tool-cylinder and is arranged to connect the supplemental chamber thereof at 2 with the forward chamber *b* at a point substantially midway between both ends of said cylinder. The arrangement or exact position of this point 2 can be varied to suit different circumstances and conditions. This by-pass is provided with a check-valve 3, which is normally closed, so as to prevent air from flowing from chamber *b* to *c*; but when the tool-piston is moving backward and there is an excess of air under pressure in the forward chamber *b* of the system such surplus will flow through the passage 1, raise the check-valve, thence pass into the supplemental chamber, from which it will flow into the other side of the system at chamber *c*. This operation will take place intermittently according to circumstances and conditions and will automatically, in connection with the automatic check-valve *x*, permit enough air to enter the system and be compressed and then transferred from the high to the low side to suit different circumstances and conditions. It is also necessary to have some means for exhausting air from chamber *c* of the tool-cylinder whenever desirable in order to move the tool-piston and tool backward. For this purpose the supplemental chamber *y* is provided with an emergency outlet port or passage 4, leading to the open air substantially in line with the by-pass 1. This emergency outlet-passage is also provided with a check-valve 5 and projecting portion 6, and a helically-coiled spring 7 is interposed between both of the check-valves, as shown, so as to keep them under a light tension. By pressing projection 6 and valve 5 slightly, without letting its lower part strike valve 3, both valves will be opened by the compressed air in chambers *b* and *c*, and the air will escape from chamber *b* through passage 1 and from chamber *c* to the outside air, thus reducing pressure of entire system; but by pressing valve 5 far enough to strike valve 3 the latter will be held seated, preventing the escape of air from chamber *b* through passage 1, while the air from chamber *c* escapes as previously explained.

I claim—

1. In mechanisms of the class described, the combination of a tool-cylinder, a reciprocating tool-piston therein, pulsating-engine-cylinder mechanism the chambers of which are of less combined volume than the chambers of the tool-cylinder, pulsating-piston mechanism in the pulsating-engine-cylinder mechanism, and tubular mechanism connecting the chambers of the tool and pulsating-engine cylinders together, substantially as described.

2. In mechanisms of the class described, the combination of a tool-cylinder, a reciprocating tool-piston mounted therein and dividing it into two chambers, pulsating-engine-cylinder mechanism provided with a plurality of chambers which are of less combined volume than the chambers of the tool-cylinder, pulsating-piston mechanism in the pulsating-engine-cylinder mechanism, and tubular mechanism connecting the chambers of the tool and pulsating-engine cylinders together, substantially as described.

3. In mechanisms of the class described, the combination of a tool-cylinder, a reciprocating tool-piston mounted therein, pulsating-engine-cylinder mechanism, reciprocating pulsating-piston mechanism in such engine-cylinder mechanism, pipe or passage mechanism connecting the chambers of the pulsating-engine and tool cylinders together, a by-pass or passage leading from one end of the tool-cylinder to a point near the middle thereof, and an automatic valve in said passage arranged to be opened and closed during the reciprocations of the tool-piston to admit air under pressure from one side of the tool-piston to the other, substantially as described.

4. In mechanisms of the class described, the combination of a tool-cylinder having a reciprocating piston therein dividing said cylinder into two chambers, a by-pass or passage leading from the chamber at one end of the tool-cylinder to a point substantially near the center thereof, and a check-valve in said passage arranged to be opened and closed during the reciprocations of the tool-piston to admit air under pressure from the chamber at the forward end to the chamber at the rear end of said tool-cylinder, substantially as described.

5. In mechanisms of the class described, the combination of a tool-cylinder having a reciprocating tool-piston mounted therein and dividing the same into two chambers, a pulsating-engine cylinder, a reciprocating piston therein, tubular mechanism connecting the chambers of the pulsating-engine and tool cylinders together, a double-ported passage connecting one chamber of the pulsating-engine cylinder with one end of the tubular mechanism that leads to the tool-cylinder mechanism, one of said ports being located adjacent to the head of the pulsating-engine cylinder and the other a short distance therefrom and arranged to be covered entirely during the reciprocations of the pulsating piston, a check-valve in the port adjacent to the cylinder-head, an emergency inlet-port connecting the last-designated chamber of the pulsating-engine cylinder with the open air and provided with an automatic check-valve arranged to be opened when the air under pressure therein falls below the atmospheric point, substantially as described.

6. In mechanisms of the class described, the combination of a tool-cylinder having a reciprocating piston therein dividing said cylinder into two chambers, a by-pass or passage leading from the chamber at one end of the tool-cylinder to a point substantially midway between both ends of the cylinder, a check-valve in said passage arranged to be opened and closed during the reciprocations of the tool-piston to admit air under pressure from the chamber at one end of said cylinder to the chamber at the other end, pulsating-engine-cylinder mechanism, reciprocating-piston mechanism in said engine-cylinder mechanism, tubular mechanism connecting the chambers of the pulsating-engine and tool cylinders together, and an emergency inlet port or passage in the chamber at one end of the pulsating-engine cylinder provided with an automatic check-valve for opening and closing the same when the pressure in said chamber falls below or rises above the atmospheric point, substantially as described.

7. In mechanisms of the class described, the combination of a tool-cylinder having a reciprocating tool-piston mounted therein and dividing the same into two chambers—a front and a rear chamber—a by-pass connecting the rear chamber at its rear end with said front chamber at a point substantially midway of the ends of said tool-cylinder, a check-valve in said by-pass arranged to open and close the same so as to admit air under pressure from the forward to the rear chamber, pulsating-engine-cylinder mechanism, a reciprocating piston mounted therein, tubular mechanism connecting the chambers of the pulsating-engine and tool cylinders together, a casing providing a supplemental chamber on the pulsating-engine cylinder with which one end of said tubular mechanism is connected, a main port connecting such supplemental chamber with the chamber at one end of the pulsating-engine-cylinder mechanism and a short distance from the head thereof so as to be covered and uncovered during the reciprocations of the pulsating pistons, an auxiliary passage provided with a check-valve connecting said supplemental chamber with the designated chamber of the pulsating-engine cylinder and adjacent to the head thereof so as to permit air to enter said chamber when the main port is closed but prevent its return from the supplemental chamber to said chamber of the pulsating-engine cylinder until such main port is again uncovered, and an emergency inlet-passage connecting the designated chamber of the pulsating-engine cylinder with the outer air and provided with a check-valve to open and close the same when the pressure in said chamber falls below and rises above atmospheric point, substantially as described.

8. In mechanisms of the class described, the combination of a tool-cylinder having a reciprocating piston therein dividing the same into front and rear chambers, a by-pass connecting the rear end of the rear chamber with the forward chamber at a point substantially between the ends of said tool-cylinder, a check-valve in said by-pass arranged to be opened during the reciprocations of the tool-piston to admit air under pressure from the forward to the rear chamber of said tool-cylinder, an emergency outlet-passage connecting the rear chamber of said tool-piston with the outer air and provided with a manually-operated valve for opening and closing said passage so as to exhaust the air under pressure from said chamber and permit the air under pressure in the front thereof to move the tool-piston rearwardly, pulsating-engine-cylinder mechanism, pulsating-piston mechanism therein, tubular mechanism connecting the chambers of the pulsating-engine and tool cylinders together, and an emergency inlet-passage connecting one chamber of the pulsating-engine-cylinder mechanism with the outer air and provided with a check-valve to open and close the same when the pressure in said designated chamber falls below or rises above the atmospheric point, substantially as described.

9. In mechanisms of the class described, the combination of a tool-cylinder having a reciprocating tool-piston in said cylinder dividing the same into two chambers—a forward and rear chamber, a supplemental chamber in said tool-cylinder and connected with the rear chamber at the rear end thereof, a by-pass in said tool-cylinder arranged to connect the supplemental chamber with the forward chamber at a point substantially midway of the ends thereof, a check-valve in said by-pass to admit air from the forward to the supplemental chamber and therethrough into the rear chamber of the tool-cylinder, an emergency outlet-passage in line with the by-pass for connecting said supplemental chamber with the open air, a manually-operated check-valve arranged therein and adapted to be opened to exhaust air from said supplemental chamber and thereby from the rear chamber of the tool-cylinder so as to permit air under pressure in the front chamber to force the tool-piston rearwardly, spring mechanism interposed between both of said check-valves to keep them normally seated, pulsating-engine-cylinder mechanism, a reciprocating piston mounted therein, tubular mechanism connecting the chambers of the pulsating-engine and tool cylinders together, a supplemental chamber on the pulsating-engine cylinder with which one end of said tubular mechanism is connected, a main port connecting such supplemental chamber with the chamber at one end of the pulsating-engine-cylinder mechanism and a short distance from the head thereof so as to be covered and uncovered during the reciprocations of the pulsating piston, an auxiliary passage connecting said supplemental chamber with the designated chamber of the pulsating-engine cylinder and adjacent to the head thereof and provided with a check-valve to permit air to enter said chamber when the main port is closed but prevent its return from said supplemental chamber into the designated chamber of the pulsating-engine cylinder until such main port is again uncovered, and an emergency inlet-passage connecting the last-designated chamber of the pulsating-engine cylinder with the outer air and provided with a check-valve to open and close the said passage when the pressure in the designated pulsating-engine chamber falls below and rises above the atmospheric point, substantially as described.

ROBERT TEMPLE.

Witnesses:
FREDRIC JOHN PALMA,
FRANK ALLEN LEWIS